Aug. 14, 1945.    H. T. KRAFT    2,382,570
FRICTIONAL CLUTCHING DEVICE
Filed March 6, 1942    2 Sheets-Sheet 1
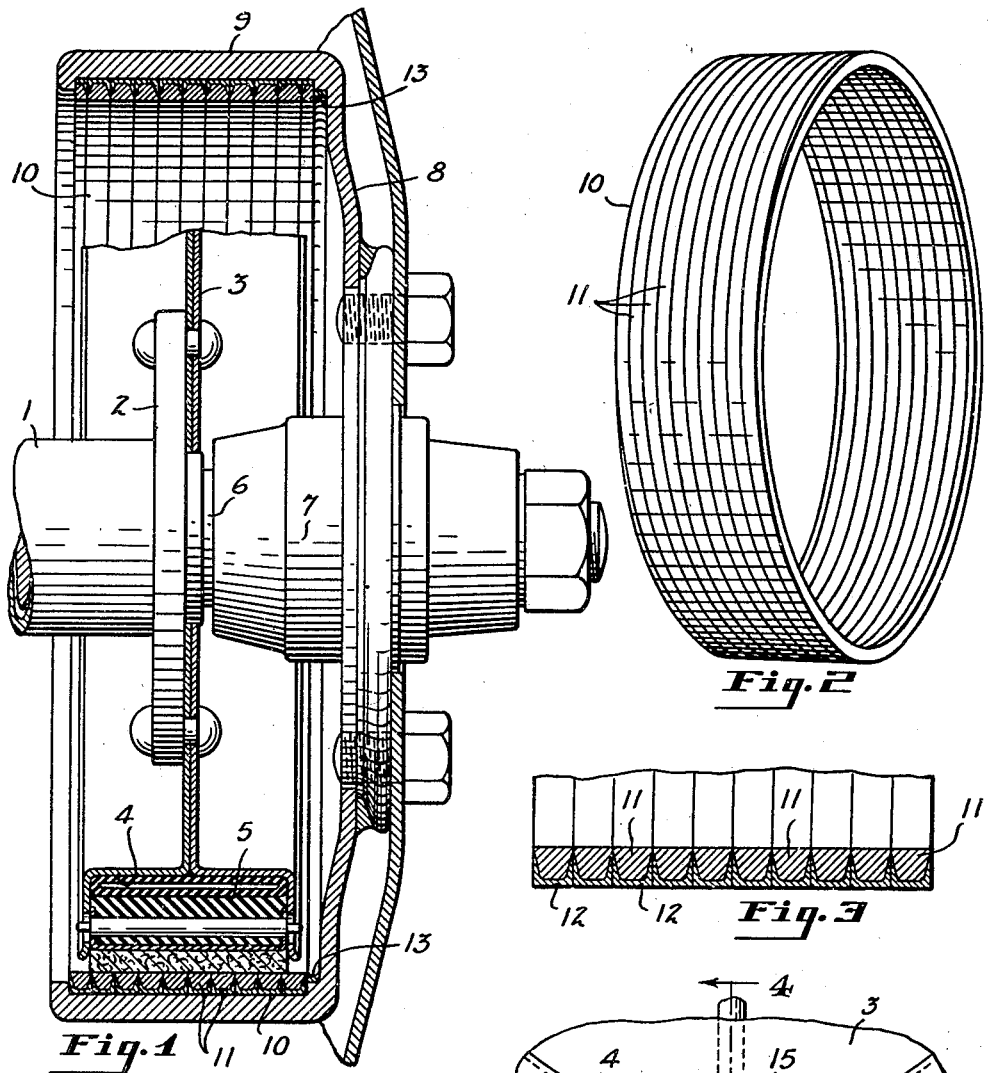
x in 188/72
     188/78
     188/152
     188/218
     188/264
     192/66
     192/75
     192/107
     192/113
     192/88
References cited:
1,588,305        192/107
1,455,389        192/107
2,105,323        188/218
INVENTOR
*Herman T. Kraft*
BY
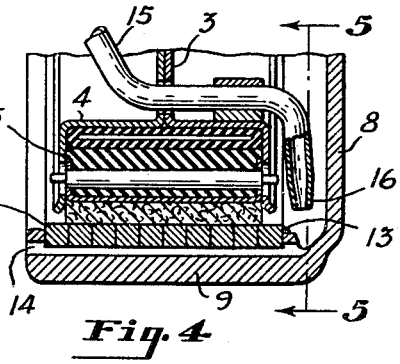
ATTORNEYS Aug. 14, 1945.    H. T. KRAFT    2,382,570
FRICTIONAL CLUTCHING DEVICE
Filed March 6, 1942    2 Sheets-Sheet 2

Spacing due to spacers 43 protect annulus 41 from heat.

INVENTOR
*Herman T. Kraft*
BY Evans + McCoy
ATTORNEYS

Patented Aug. 14, 1945

2,382,570

UNITED STATES PATENT OFFICE 2,382,570

FRICTIONAL CLUTCHING DEVICE

Herman T. Kraft, Akron, Ohio, assignor to The General Tire & Rubber Company, Akron, Ohio, a corporation of Ohio Application March 6, 1942, Serial No. 433,530

5 Claims. (Cl. 188—71)

The present invention is an improvement in frictional clutching devices of the type interposed between the two coaxial relatively rotatable members of a brake or clutch.

In heavy duty friction brakes or clutches a large amount of energy is rapidly converted into heat at the contacting friction surfaces. One of the clutching members is usually in the form of a movable shoe having a slip resisting surface of a refractory material, which is a relatively poor conductor of heat, and the coacting friction member is usually in the form of a metal drum, cone disc or the like formed of a metal such as steel which has the strength necessary to resist the great torsional stresses to which the member may be subjected in service. Intense heat generated upon the surface of the metal friction member may momentarily raise the temperature of such surface to a point near the melting point of the metal and the heating of the engaging surface is so rapid that the temperature of the engaging face of the metal member greatly exceeds the temperature to which other portions of the metal member are raised, so that severe stresses tending to deform the metal member are set up as the member is cooled. The stresses to which the metal drum, cone, or disc are subjected in service cause distortion of the metal member and cause checking or cracking of the friction surface thereof. Such distortion of metal brake members has been particularly troublesome in the brakes of airplane landing wheels since the deterioration of the metal brake members in such wheels has been so rapid that frequent replacement of the metal friction member has been necessary.

The present invention has for its object to provide a frictional clutching device so constructed that the metal parts thereof are protected against damage by heat generated at the friction surface. More particularly, it is an object of the invention to provide the metal backing member, i. e., the drum, cone, disc or the like, with a shoe engaging facing member connected to the backing member in such manner that the torsional forces are effectively transmitted to the backing member and so that the facing member is free to expand or contract due to temperature variations without setting up stresses in the backing member which tend to distort the same.

A further object of the invention is to provide means for rapidly dissipating the heat generated between the frictional engaging surfaces.

With the above and other objects in view the invention may be said to comprise the device as illustrated in the accompanying drawings hereinafter described and particularly set forth in the appended claims, together with such variations and modifications thereof as will be apparent to one skilled in the art to which the invention pertains.

Reference should be had to the accompanying drawings forming a part of this specification, in which:

Figure 1 shows brake embodying the invention in axial section;

Fig. 2 is a perspective view of the drum facing band;

Fig. 3 is a transverse section through the facing band on an enlarged scale;

Fig. 4 is a fragmentary sectional view showing means for applying a liquid coolant to the facing band;

Fig. 5 is a section taken on the line 5—5 of Fig. 4;

Figure 6:
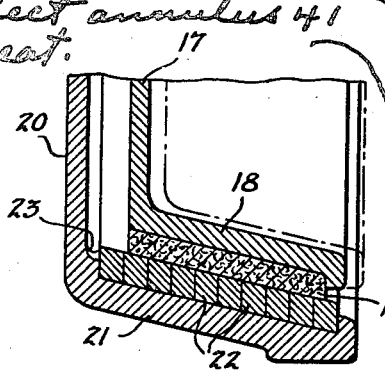
Fig. 6 is a sectional view showing the invention applied to a brake or clutch of the cone type.

In Figs. 1 to 5 of the drawings, the invention is shown applied to a brake of the drum type in which an axial sleeve or housing 1 has a flange 2 to which is attached a disc 3 having a peripheral channel 4 in which is mounted an expansible shoe 5. An axle 6 journaled in the housing 1 has a wheel hub 7 attached thereto to which is fixed a drum 8 which has a cylindrical flange 9 which surrounds the expansible annular shoe 5. A facing band 10 is applied to the interior of the flange 9 and provides a surface for engagement with the shoe 5. The band 10 is formed of an elongated strip of metal of rectangular cross section wound in closely spaced helical convolutions to provide a band of cylindrical form which fits within the flange 9 and provides a facing for the interior surface of the flange.

As shown in Fig. 3 of the drawings, the metal strip forming the band 10 has a body portion 11 composed of abrasion resistant metal and a backing portion 12 which covers the outer and side faces of the strip, which is composed of a metal of high heat conductivity such as copper. The body portion 11 may be formed of abrasion resistant steel and the copper backing 12 serves to rapidly dissipate heat generated in the facing member. The facing member 10 is attached to the flange 9 by a weld, indicated at 13, which extends along one of the end convolutions. The rigid attachment of one of the end convolutions of the facing band to the drum provides a firm anchorage through which torsional stresses are transmitted through the drum to the shoe 5, and since only one convolution of the band is attached to the drum, the metal strip which forms the band is free to expand or contract as it is heated and cooled without imparting stresses to the drum flange which would tend to distort the flange.

If desired, excessive heating of the facing band 10 may be prevented by passing a liquid coolant between the band 10 and the flange 9 while the brake is being applied. As shown in Figs. 4 and 5, the flange 9 may be provided with transverse grooves 14 on its interior face and a liquid supply pipe 15 may be attached to the stationary disc 3 and provided with a nozzle 16 adapted to direct a stream of liquid against the interior of the drum adjacent the periphery. The drum being carried by the rotating member will be rotating at high velocity when the brake is applied so that liquid delivered through the pipe 15 will be carried by centrifugal force into the channels 14 across the exterior of the band 10.

In Fig. 6 of the drawings the invention is shown applied to a cone clutch or cone brake which has an inner member 17 provided with a conical flange 18 to the exterior surface of which is attached a shoe 19. An outer member 20 is provided with a conical flange 21 which overlies the flange 18 and the flange 21 is provided with an inner facing band 22 of conical form composed of a helically wound metal strip. The strip forming the facing member 22 may be of rhombic or rhomboidal cross section so that the contiguous faces of adjacent convolutions will be disposed perpendicularly with respect to the axis of the brake or clutch. The facing band 22 has one end convolution thereof attached to the flange 21 by suitable means such as a weld 23.

Figure 7:
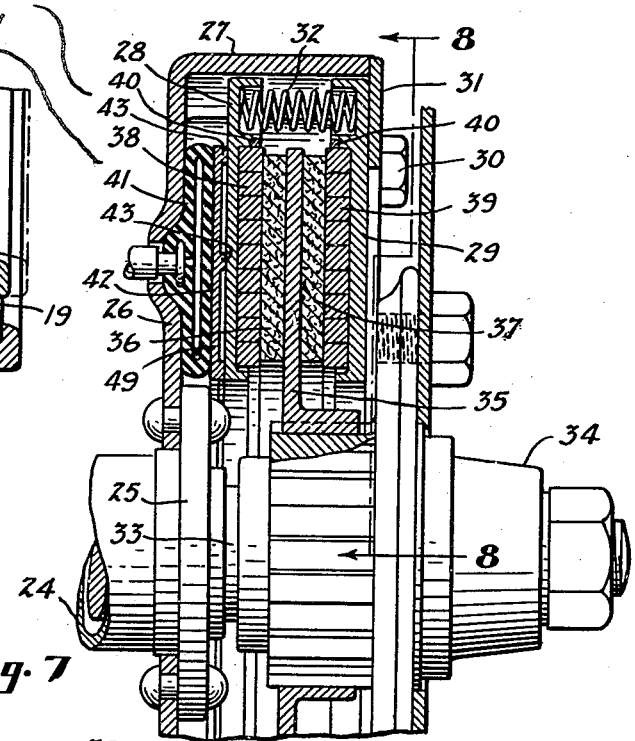
Fig. 7 is an axial section showing the invention applied to the brake of the disc type.
Figure 8:
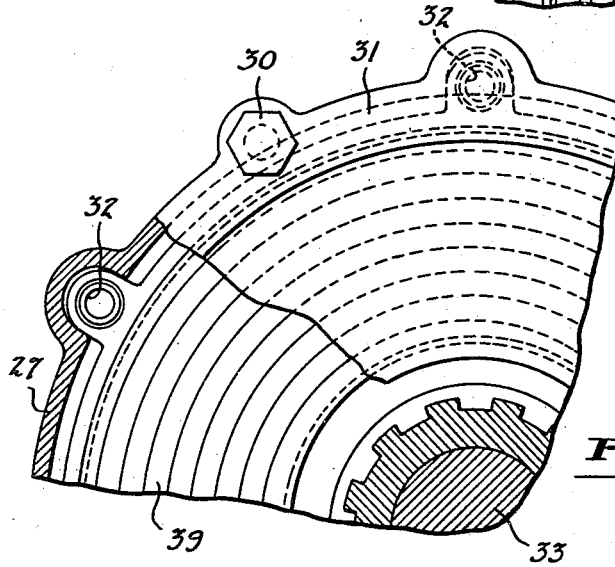
Fig. 8 is a fragmentary side elevation of the brake shown in Fig. 7.

In Figs. 7 and 8 the invention is shown applied to a brake of the disc type. In this brake a substantially axial sleeve or housing 24 is provided with a flange 25 to which is attached a web 26 which is provided with a cylindrical flange 27 and forms a stationary brake drum. Within the flange 27 of the drum two spaced annular discs 28 and 29 are mounted. These discs are supported for axial movements within the drum by means of a series of circumferentially spaced bolts 30 which extend through the discs adjacent the peripheries thereof and connect the web 26 of the drum with a ring 31 attached to the outer edge of the flange 27. The discs 28 and 29 are normally held in spaced relation by means of a series of coil springs 32 interposed between the discs intermediate the supporting bolts 30. An axle 33 journaled in the housing 24 has a wheel hub 34 attached thereto and the hub 34 has a disc 35 splined thereon which is interposed between the movable discs 28 and 29 carried by the drum. The disc 35 is provided on opposite sides thereof with slip-resisting faces in the form of annular shoes 36 and 37. The discs 28 and 29 are provided with facing plates 38 and 39 on their opposed faces. Each of the facing plates 38 and 39 is formed of a metal strip wound in a spiral coil with closely spaced convolutions to provide flat friction plates for engagement with the shoes 36 and 37 attached to the opposite faces of the disc 35. The facing plates 38 and 39 each have one end coil thereof attached to its disc by suitable means such as a weld 40. The remaining convolutions of the facing members are un-attached so that the strip forming the facing member is free to expand and contract without transmitting excessive stresses to the attached disc. The discs 28 and 29 are moved into clamping engagement with the disc 35 by means of an inflatable annulus 41 attached to the web 26 of the drum. The annulus bears against an annular plate 42 which is held out of contact with the adjacent disc 28 by means of spacers 43 to provide an air space which protects the inflatable annulus against excessive heating.

In each of the modifications above described the metal backing member, whether it be drum, cone or disc, is protected against distortion due to uneven heating by a shoe engaging facing member which is so connected to the backing member that it is free to expand and contract as it is heated and cooled so that the heat generated by friction does not set up excessive stresses in the metal backing member.

It is to be understood that variations and modifications of the specific devices herein shown and described for purposes of illustration, may be made without departing from the spirit of the invention.

What I claim is:

1. A frictional clutching device comprising two relatively rotatable coaxial clutch elements, one of said clutch elements comprising a shoe and the other of said clutch elements comprising an annular backing member opposed to said shoe and a shoe engaging facing member attached to said backing member and free to expand and contract independently of said backing member, said facing member being in the form of a strip bent to provide a plurality of closely adjacent convolutions, one end of said strip being attached to said backing member, the side faces of said strip and the face thereof engaged with the backing member being composed of a metal of higher heat conductivity than the body of the strip.

2. A frictional clutching device comprising two relatively rotatable clutch elements, one of said clutch elements comprising an annular shoe having an external peripheral engaging face and the other of said elements comprising an annular metal backing member having an internal face opposed to the peripheral engaging face of said shoe, and a shoe engaging facing member interposed between said internal face and said shoe, said facing member being in the form of a helical metal strip having one end attached to said backing member and its other end free whereby said facing member may expand and contract due to temperature variations without distorting said backing member.

3. A frictional clutching device comprising two relatively rotatable clutch elements, one of said clutch elements comprising an annular shoe having an external peripheral engaging face and the other of said elements comprising an annular backing member having an internal face opposed to the peripheral engaging face of said shoe, and a shoe engaging facing member interposed between said internal face and said shoe, said facing member being in the form of a helical strip having one end attached to said backing member and its other end free whereby said facing member may expand and contract due to temperature variations without distorting said backing member, and means for supplying a liquid coolant to the space between said facing member and said backing member.

4. A clutching device comprising two axially aligned relatively rotatable discs, a refractory shoe attached to the face of one disc, and a facing member composed of a spirally coiled metal strip attached at one end to the other disc and interposed between the shoe and the latter disc, said facing member having convolutions free to move with respect to said attached end and the supporting disc when expanded by heat, and means for moving one disc toward the other to engage the shoe and facing member.

5. In a clutching device of the friction shoe type, a heat resistant shoe engaging element comprising an annular metal backing member having a face portion shaped to conform to the engaging face of the shoe and a facing member comprising a metal strip of substantially rectangular cross section having a flat face bearing against said face portion throughout the length of the strip, said strip being bent in a series of closely adjacent convolutions to provide a shoe engaging surface on said backing member, one end convolution of said strip being rigidly attached to the backing member and the other convolutions being unattached and movable on the face portion of the backing member when subjected to thermal expansion or contraction.

HERMAN T. KRAFT.